M. J. WOODWORTH.
COOKING UTENSIL.
APPLICATION FILED MAY 20, 1911.
1,013,253.
Patented Jan. 2, 1912.
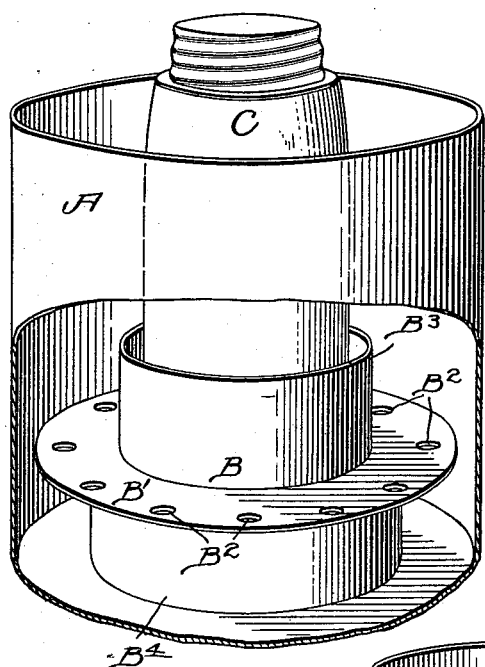
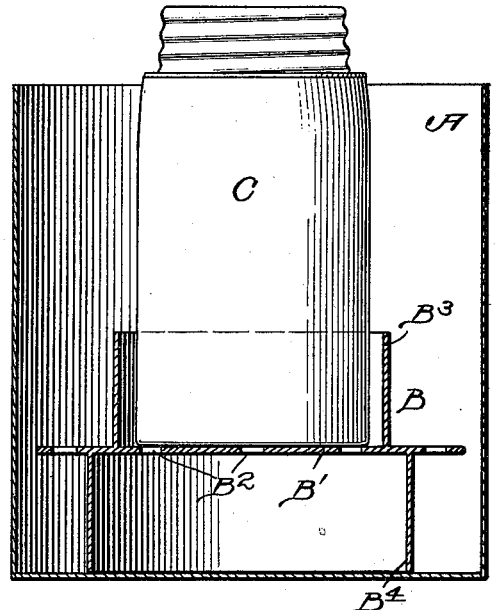
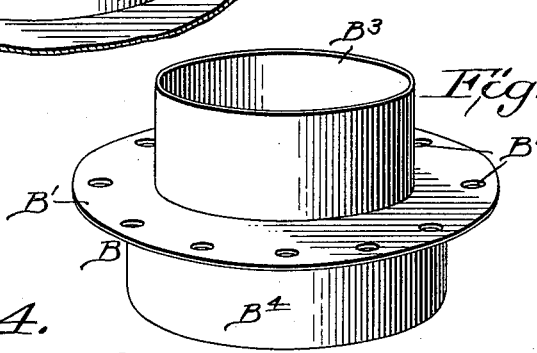
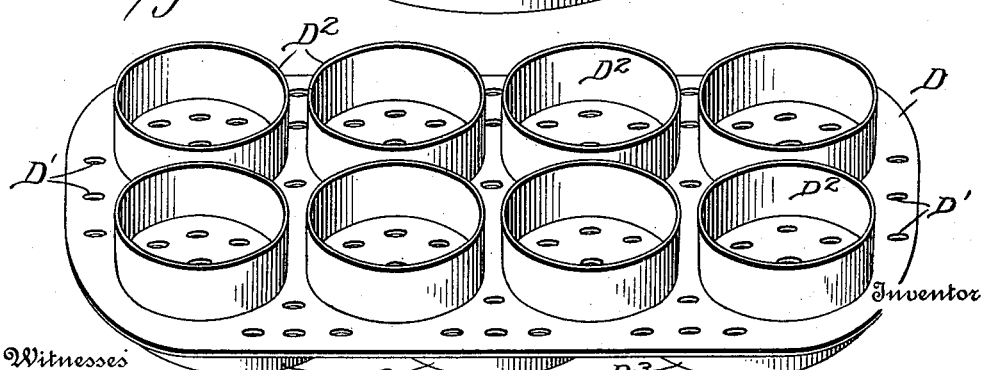
Witnesses
Inventor
M. J. Woodworth
By
Attorney

UNITED STATES PATENT OFFICE.

MARGARET J. WOODWORTH, OF ELBA, NEBRASKA.

COOKING UTENSIL.

1,013,253.  Specification of Letters Patent.  Patented Jan. 2, 1912.

Application filed May 20, 1911. Serial No. 628,534.

*To all whom it may concern:*

Be it known that I, MARGARET J. WOODWORTH, a citizen of the United States, residing at Elba, in the county of Howard and State of Nebraska, have invented a new and useful Improvement in Cooking Utensils, of which the following is a specification.

This invention is a new and useful cooking utensil, particularly adapted for use in preserving or canning but it will be understood that the invention can be used for other culinary purposes.

The object of the invention is to provide a device to be used in connection with a kettle or boiling receptacle, for the purpose of holding a jar or can away from the bottom and sides of the receptacle, and another object of the invention is to provide a device which can be used within a boiling receptacle for the purpose of holding the material being cooked away from the sides and bottom of the receptacle.

Another object of the invention is to provide a single device capable of use in connection with various sized jars or other articles.

With these objects in view, my invention consists in the novel features of construction hereinafter fully described and pointed out in the claims.

In the drawings forming a part of this specification:—Figure 1 is a perspective view showing the practical application of my invention, the front side of the receptacle being broken away to disclose my invention arranged therein. Fig. 2 is a vertical sectional view, the preserving or canning jar being shown in elevation. Fig. 3 is a detail perspective view of my invention removed from the receptacle, and, Fig. 4 is a detail perspective view showing a modified form of my invention adapted for use in connection with a large sized receptacle and a plurality of preserving or canning jars.

Referring to the drawings, A, indicates a receptacle, which may be of any size desired, and which is adapted to contain water, said receptacle resting upon the stove as usual, and within this receptacle, I place my invention B, as most clearly shown in Figs. 1 and 2, and which as before stated is intended to hold the preserving jar or can C, away from the sides and bottom of the receptacle B, during the cooking operations. This element B comprises a flat plate B', having a plurality of perforations $B^2$, and upon the upper face of this perforated plate, I arrange a circular ring or wall $B^3$, and upon the bottom of said plate, I also arrange a circular ring or wall $B^4$, but it will be noted that the ring $B^3$, is of less diameter than the ring $B^4$, said ring $B^3$, being intended to receive one sized can or jar, while the ring $B^4$, is intended to receive a larger sized can or jar, and it will thus be seen that these rings or walls serve not only to place the article upon the top of the plate, but also to elevate the plate above the bottom of the receptacle A.

In operation, it will be understood that the receptacle A, is filled with water, the can or jar C, is arranged upon the holder B, and the water within the receptacle is brought to boiling and maintained until the contents of the can or jar C, have been cooked sufficiently and then the screw caps or covers can be placed upon the jars and sealed. It will therefore be noted that my device holds the can in the proper position, both with reference to the sides and bottom of the receptacle and as the plate B', is perforated there is a free circulation of water completely around the can or jar.

If desired my holder can be utilized for the purpose of cooking vegetables, such as potatoes and the like and when so used will serve to keep the potatoes away from the bottom of the receptacle and will serve as a drainer when the said holder is elevated for the purpose of removing the vegetables from the receptacle.

In Fig. 4 I have shown a slight modification in which a large plate D, is employed having perforations D', produced therein and upon the upper side thereof are a series of small rings or walls $D^2$, while upon the bottom of the plate are arranged the large sized circular rings or walls $D^3$. This form of holder is intended to be used in connection with a large sized receptacle and is intended to hold at one time a number of cans or jars and by having the rings or walls of different sizes, one holder can be utilized for different sized cans or jars.

Having thus fully described my inven- tion, what I claim as new and desire to secure by Letters Patent, is:—

A device for holding jars or cans comprising a flat perforated plate, an outwardly open ring carried by one side of said plate, and an outwardly open ring carried by the opposite side of the plate, said last mentioned ring being of greater diameter than the first mentioned ring, either ring being adapted to receive a jar or can or to serve as a base for supporting said plate.

MARGARET J. WOODWORTH.

Witnesses:
GEO. S. COOPER,
H. JEPSON.

Copies of this patent may be obtained for five cents each, by addressing the "Commissioner of Patents, Washington, D. C."